Oct. 14, 1958  J. L. STRATTON  2,856,584
VOLTAGE REFERENCE LEVEL VARIANCE INDICATOR
Filed Sept. 28, 1956
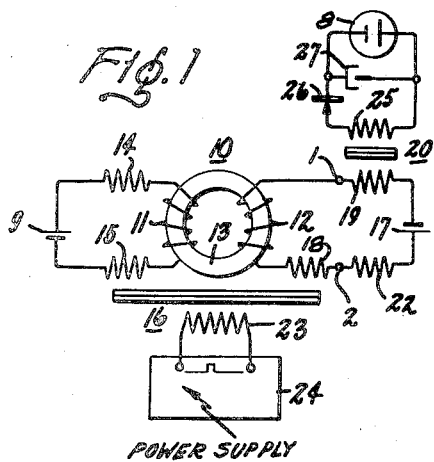
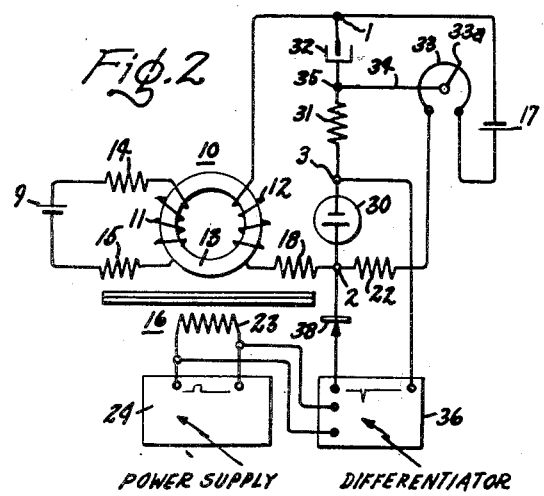
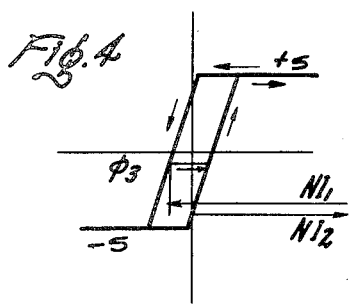
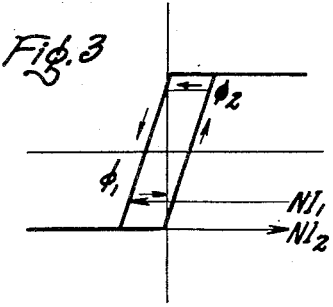
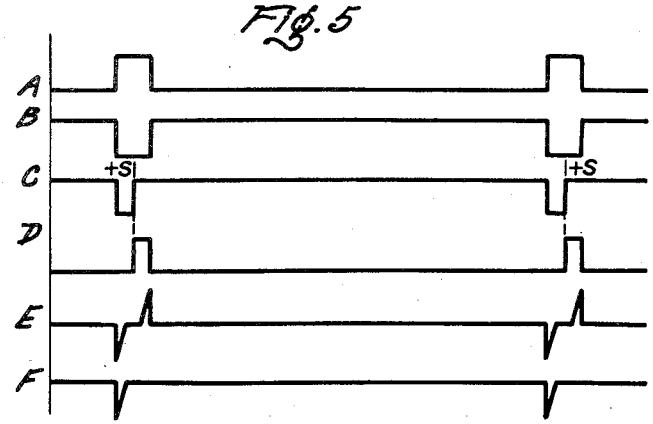
Inventor
Jerry L. Stratton
by Morton D. Morse
His Attorney

United States Patent Office 2,856,584
Patented Oct. 14, 1958

2,856,584

VOLTAGE REFERENCE LEVEL VARIANCE INDICATOR

Jerry L. Stratton, Schenectady, N. Y., assignor to General Electric Company, a corporation of New York Application September 28, 1956, Serial No. 612,709

10 Claims. (Cl. 324—117)

The present invention is directed to an indicator which will indicate whether or not a particular voltage is below a given reference level or which will indicate whether or not the voltage is above a given reference level. More particularly, the invention relates to such a device which utilizes a saturable core impedance device.

The indicator disclosed herein may be utilized for indicating an under voltage or over voltage condition, for comparing two voltages to determine when they are equal, as an over voltage relay indicating device, or as a low or high temperature indicator (if used with thermocouple inputs).

When utilizing a single electric storage battery or a bank of batteries, it is desirable to have an indication of a low voltage condition on each battery cell and it is desirable in many instances to have a means of continuously monitoring the voltage on each cell. Also, when recharging a storage battery, it is desirable to have a means to indicate when the charging voltage is above the charging level desired. Although the invention is not so limited, it is described in conjunction with the low or high voltage indicator application.

It is an object of this invention to provide a device which will indicate either when a given voltage drops below a selected reference level or when the given voltage rises above the reference level.

Briefly stated in accordance with this invention, a single core saturable impedance device is provided with two windings, one of which is energized by a reference voltage and the other one of which is energized from the source being monitored. The degree of magnetization of the core is determined by the relative magnitude of the reference and monitored voltage sources. In order to ascertain the degree of magnetization of the core, and consequently the relationship of the two voltage sources, means is provided to supply both windings with a voltage pulse at regular intervals. As long as the reference and monitored voltage sources have the desired relationship, the core of the saturable impedance device remains unsaturated and the voltage across the windings will be equal in magnitude and of opposite polarity to the applied voltage pulse. If, however, the relationship of the monitored and the reference voltage sources changes, the core member becomes saturated and the impedance of the two windings is reduced substantially. Thus, the voltage developed across the windings will not be equal to the voltage pulse introduced into their circuits. The difference voltage may then be utilized to operate an indicator. If it is desired to indicate an under voltage, voltage pulses are generally applied to the circuits which are of a polarity to oppose current flow in the winding connected across the monitored cell and aid current flow in the winding connected across the reference. If it is desired to indicate an over voltage condition the voltage pulses applied are generally of an opposite polarity; i. e., of a polarity to aid current flow in the winding which is connected across the monitored cell and oppose current flow in the reference winding.

The novel features which are believed to be characteristic of this invention are set forth with particularity in the appended claims. The invention itself, however, both as to its organization and methods of operation together with further objects and advantages thereof may best be understood by reference to the following description taken in connection with the accompanying drawing in which:

Figures 1 and 2 are schematic diagrams illustrating two embodiments of the present invention;

Figures 3 and 4 show hysteresis loops utilized in explaining the operation of the invention; and Figure 5 illustrates various wave shapes utilized in explaining the operation of the circuits of Figures 1 and 2.

Referring specifically to Fig. 1 of the drawing, a simplified circuit diagram is provided showing the main elements of one embodiment of a single voltage monitoring system. The system illustrated may be duplicated for each voltage to be monitored. For example, if the system is used to monitor the voltage of each cell of a 252 cell electric storage battery, 252 of the individual systems illustrated and described are utilized.

The system which is utilized to monitor the voltage developed by the storage battery cell 9 includes a magnetic amplifier 10 having a pair of magnetizing windings 11 and 12 and core member 13. One of the magnetizing windings 11, which may be called the test or monitoring winding, is connected in a series monitoring circuit which includes a resistor 14 and a secondary winding 15 of a pulse supply transformer 16. This series circuit is connected to receive the voltage of the monitored battery cell 9.

A unidirectional reference voltage is applied to the other magnetizing winding 12 (the reference winding) of the magnetic amplifier 10 by a standard or reference voltage source 17. The series reference circuit includes a primary winding 19 of impedance matching transformer 20, the reference voltage source 17, a resistor 22, a secondary winding 18 of the pulse supply transformer 16, and the reference winding 12. The secondary windings 15 and 18 of the supply transformer 16 are provided as a means of introducing a voltage pulse into each of the circuits just described; i. e., the circuits of the monitoring and reference windings 11 and 12 by connecting transformer primary winding 23 across a conventional pulse power supply 24. As will be described subsequently, the voltage pulses are introduced into the reference and monitoring circuits in order to cause an abrupt change in the impedance of the reference winding 12 of the magnetic amplifier when the core member 13 is saturated to thereby develop an indicating voltage when the voltage of the monitored cell 9 drops below the desired value. This circuit may also be utilized to indicate an over-voltage as will be more fully explained later.

The operation of the circuit may best be understood by referring to Figures 3 and 4 wherein hysteresis loops of a typical ferromagnetic material which may be used in the core 13 of the magnetic amplifier 10 illustrated in Figures 1 and 2 are shown. The hysteresis loop represents a plot of flux density (plotted along the axis of the abscissa) in the core 13 against the external magnetizing force H (plotted along the axis of ordinates) applied to the core 13. In order to simplify the present discussion the hysteresis loop of Figure 3 is assumed to represent both the static and dynamic hysteresis loop of the core material used. The dynamic hysteresis loop represents a plot of the flux density in the core 13 against the external magnetizing force applied to the core when the applied magnetizing force is varied at a finite speed (the finite speed being the frequency of the reactor power supply). The static hysteresis loop represents the plot of the same parameters when the magnetizing force is changed very slowly (so slowly that the eddy current effects are negligible). The points +S and —S, respectively, represent positive and negative saturation of the core material; i. e., the points where the magnetizing force may be increased without changing the flux in the core member.

When a unidirectional potential is applied across a winding of a saturable core impedance device and a steady state condition obtains, the magnetizing force, and consequently the flux level in the core member, is set by the product of the current through the winding and the number of turns of the winding on the core. This product is referred to as ampere turns and is designated by the symbol NI. When an alternating voltage or a pulsating unidirectional voltage is applied across such a winding, the change of the flux ($\Delta\phi$) in the core caused by the voltage is equal to the integral of the voltage over the period of time which it is applied. This integral is referred to as the volt-time integral or simply volt-seconds throughout this specification.

Assume that the battery cell 9 is polarized in such a direction that the current which it produces in the test winding 11 produces a given number of ampere turns $NI_1$ in the core member 13 which tend to drive the core towards negative saturation and the reference voltage source 17 is polarized in such a direction that the current which it forces through the reference winding 12 produces a given number of ampere turns $NI_2$ in the core member 13 which tend to drive the core member toward positive saturation. The direction of these magnetizing forces $NI_1$ and $NI_2$ are shown by the arrows in Fig. 3. If the ampere turns $NI_1$ from the test winding 11 are slightly greater than the ampere turns $NI_2$ from the reference winding, a steady state flux will be produced in the core member 13 of the magnetic amplifier 10 which will place the operation of the core on the back side of the hysteresis loop at point $\phi_1$, as shown in Fig. 3.

Under the conditions set forth the magnetizing current for core member 13 is supplied by the monitored cell 9. This is insured by making the resistance 22 in the reference circuit of a much higher value than the resistor 14 in the test circuit so that the impedance of the reference circuit is on the order of ten times as high as that of the test circuit.

Assume now that a unidirectional voltage pulse of the form illustrated in Fig. 5A is induced in the secondary winding 15 by transformer 16, and that the induced voltage is of such a polarity that it opposes the current supplied by the monitored cell 9. A similar unidirectional square wave voltage pulse is induced across the transformer secondary winding 18 in the reference circuit but the effects of the voltage pulse will be neglected for the initial discussion. The effects of this pulse may be neglected since the monitoring circuit actually takes control due to the fact that it is a low impedance circuit (relative to the reference circuit) and therefore supplies the magnetizing current for the core 13. It is to be particularly noted, however, that either circuit may be made to supply the magnetizing current.

Since the voltage pulse introduced into the monitoring circuit is of a polarity to oppose the current (magnetizing current) supplied by the monitored cell 9, the ampere turns $NI_1$ produced by the test winding 11 are reduced and the net magnetizing force on the core will move toward positive saturation. Thus, when referring to Figure 3 the operation of the core on the hysteresis loop is from the steady state point of operation $\phi_1$ on the back side of the hysteresis loop across to the front side of the loop and up along the front side of the loop toward positive saturation +S as indicated by the arrows. If the volt-time integral of the voltage pulse (volt-seconds) is sufficient to change the flux level in the core 13 of the magnetic amplifier toward positive saturation; for example, to a point $\phi_2$ on the positive side of the hysteresis loop, but not drive the core into saturation, the impedance of the test and reference windings 11 and 12 will not change appreciably. Thus, substantially all of the voltage pulse induced in the transformer secondary winding 18 in the reference circuit is utilized to change the flux level in the core member 13 and the net voltage across the series combination of the transformer secondary winding 15 and the test winding 11 is zero.

The flux change in the core member 13 due to the voltage pulse in the monitoring circuit induces a voltage across the reference winding 12 (by transformer action) which is equal in magnitude to the voltage pulse across the test winding 11 and of a polarity to resist the change of flux taking place. Consider the voltage wave of Figure 5A to be the same as the voltage which appears across the test winding 11. If this is the case, the voltage wave illustrated in Figure 5B represents the induced voltage across the monitoring winding 11. Now considering the voltage pulse introduced into the reference circuit by secondary winding 18 of the pulse power supply transformer 16 to have the same wave shape and polarity as the square wave voltage 5A. It will be seen that each voltage pulse introduced into the reference circuit from the transformer 16 is opposed by an equal and opposite voltage pulse induced in the reference winding 12. Thus, the net voltage across the series combination of the reference winding 12 in transformer secondary winding 18; i. e., between terminals 1 and 2, is also zero. After the occurrence of each voltage pulse, the flux in the core member 13 collapses until the original flux level (point $\phi_1$, Figure 3) is restored since the magnetizing force applied due to the pulse voltage is removed and the net difference in applied ampere turns ($NI_1-NI_2$) is negative. This action is explained in more detail subsequently.

If the current supplied by the monitored battery cell 9 decreases; i. e., if the voltage across the battery cell 9 decreases, the ampere turns $NI_1$ in the test winding 11 are reduced. Thus, the level of the flux in the core 13 of the magnetic amplifier is high (near to positive saturation). This condition is illustrated in Figure 4 where the net difference between the ampere turns $NI_1$ supplied by the monitoring winding 11 and the ampere turns $NI_2$ supplied by the reference winding 12 are reduced to set the flux in the core member 13 on the back side of the hysteresis loop nearer positive saturation; e. g., at point $\phi_3$.

Since the flux level of the core is changed toward positive saturation, it takes fewer volt-seconds to drive the core into positive saturation. Therefore, if the voltage of the monitored cell 9 drops below the selected reference level, the volt-seconds applied to the core member 13 by the next voltage pulse in the monitoring circuit will drive the core into saturation and thereby reduce the impedance of the reference winding 12 to a very low value.

This action may be understood by referring to the hysteresis loop of Figure 4 and starting from the point of operation on the back side of the hysteresis loop labelled $\phi_3$. Again assume that a voltage pulse which is of a polarity to oppose the voltage of the monitored cell 9 is introduced into the monitoring circuit. This pulse provides a magnetizing force to move the operation of the core to the front side of the hysteresis loop and drive the flux level in the core up to some point past positive saturation +S. When the core member 13 is saturated, the voltage pulse is no longer utilized to increase the flux level in the core member 13. The impedance of the test winding 11 is thus effectively reduced and the remainder of the voltage pulse (after saturation of the core member) introduced into the reference circuit appears across the series combination of the test winding 11 and transformer secondary winding 15.

Once the core member 13 becomes saturated the transformer action no longer takes place due to the fact that the flux level in the core ceases to change. Therefore, the induced voltage which appears across the reference winding 12 does not last for the full period of the voltage pulse introduced into the monitoring circuit by means of the transformer secondary winding 18. The voltage wave illustrated in Figure 5C represents the voltage induced across the reference winding 12 when the core member 13 is driven into the saturation. The broken lines designated +S, which coincide with the back side of the square wave of Figure 5C, illustrate that the voltage across the reference winding 12 drops off immediately upon the occurrence of saturation (this also means that the impedance of the winding 12 drops to substantially zero upon positive saturation of core member 13).

If once again we consider the voltage wave of Figure 5A to be that which is induced across the secondary winding 18 of the supply transformer 16, then the voltage wave of Figures 5A and 5C may be compared to obtain the net voltage which appears across the series combination of the transformer secondary winding 18 and reference winding 12; i. e., the voltage which appears between terminals 1 and 2. The voltage wave of Figure 5D illustrates the difference between these two voltages. An inspection of this figure shows that upon saturation of the core 13 a voltage spike appears between the terminals 1 and 2. Since the circuit parameters are adjusted so that saturation occurs only when the voltage of monitored cell 9 is lower than the predetermined desired value, the voltage spike between terminals 1 and 2 occurs only upon such an under-voltage condition.

For the sake of discussion, the difference in current in the test winding 11 which is required to produce a detectable output voltage between the points 1 and 2 is referred to as "error" current and the voltage required to produce this current as the error voltage.

The interval following a pulse in which the flux in the core 13 is returned to its original value (i. e., steady state value) is referred to as the reset period. This reset period contains the same number of volt-seconds as the voltage pulse. That is to say, that a unidirectional voltage must be applied across the test and reference windings 11 and 12 during the reset period which is of such a magnitude that the integral of the voltage over the reset time is equal to the volt-second in the pulse which changed the flux level in the core member 13 toward positive saturation. For the condition described where the core was driven into positive saturation (see Figure 4), this reset voltage provides a magnetizing force to move the operation of the core down from positive saturation +S along the back side of the hysteresis loop to the point $\phi_3$. For the condition illustrated in Figure 3 where the core was not driven into positive saturation but driven to point $\phi_2$ below positive saturation +S on the positive side of the hysteresis loop, the reset voltage provides a magnetizing force to drive the core back across hysteresis loop and down the back side of the loop to the initial flux level $\phi_1$ as indicated by the arrows. Since the applied voltage pulses contain the same number of volt-seconds regardless of the point of operation on the hysteresis loop, the reset of the core is accomplished by the same number of volt-seconds regardless of the point of operation on the hysteresis loop.

The resetting operation can be performed by the combined effect of the voltage induced in the monitoring circuit by the supply transformer secondary winding 15 between positive pulses and the error voltage, or substantially by either one alone. The factors on which this depends are length of reset period relative to length of pulse, resistance of the circuit which supplies the pulse, the width of the hysteresis loop of the core material 13, and the magnitude of the error voltage. However, in an ideal combination of these factors, the maximum volt-time integral which the output spike Fig. 5D contains is equal to the product of the error voltage and the reset time.

From the above discussion it may be seen that the only requirement with regard to the duration of the applied pulses is that a sufficient period of time be provided between pulses to permit the reset of the core member 13. Satisfactory results were obtained utilizing 60 cycle pulses of 160 volts with a duration or pulse width of 300 microseconds.

In order to provide an indication of a low voltage on the battery cell 17, a glow lamp 8, such as a neon lamp, is provided. This lamp is connected in series with a rectifier 26 and the combination is connected across the secondary winding 25 of matching transformer 20. To make the indication more noticeable, a capacitor 27 is connected in parallel with the indicator lamp 8 and a blocking layer rectifier 26 is connected in series with this combination. Each time a voltage spike appears across the series combination of the reference winding 12 and the secondary winding 18 of the pulse supply transformer 16; i. e., between terminals 1 and 2, a voltage is applied to the primary winding 19 of the matching transformer 20. Consequently, a voltage pulse is induced in the secondary winding 25 which is applied across the capacitor 27. When the voltage on the capacitor 27 builds up to the ignition point on the neon lamp 8, a flash is produced. The blocking rectifier 26 is utilized to prevent discharge of capacitor 27 through the matching transformer secondary winding.

By providing the reference winding 12 of the magnetic amplifier 10 with the proper number of turns; i. e., by proper impedance matching, the impedance matching transformer 20 may be eliminated altogether; in which case the rectifier-capacitor-lamp combination is connected directly between the terminals 1 and 2.

The circuit of Fig. 2 operates on the same principle as described with respect to the circuit of Fig. 1 and the corresponding components of the two circuits are given identical reference numerals. The monitoring circuit of the circuit of Fig. 2 is identical to that illustrated in Fig. 1. However, a slightly different arrangement is used in the reference circuit and in the circuit of indicating lamp 30. These differences are provided chiefly for the purpose of giving a different mode of operation to the indicating circuit. In this arrangement the indicating lamp 30 is triggered by the voltage spike which appears between the terminals 1 and 2 when an under voltage exists across the monitored cell 9 and the current through the lamp is sustained by the reference voltage source 17.

In order to provide this different mode of operation, the indicator lamp 30 is connected in a series circuit which includes resistor 31 and capacitor 32 and this series circuit is connected directly between the terminals 1 and 2. The blocking capacitor 32 is provided in this circuit to block the direct current which would normally flow in this circuit between terminals 1 and 2 due to the reference source 17. Although the capacitor 32 prevents a direct current from flowing through this series circuit, the voltage pulse or spike which appears between terminals 1 and 2 causes a lamp triggering current to flow therethrough which fires or triggers the lamp 30. The actual sustaining voltage for the indicator lamp 30 is developed across the resistor 22 and the top portion of the slide wire potentiometer 33 by the reference voltage source 17. The slide wire potentiometer and resistor 22 are connected in the series reference circuit and, therefore, the reference voltage source 17 develops a voltage across these two resistors. The tap 33a on this slide wire potentiometer 33 is connected by means of a lead 34 to a terminal 35 on the series circuit of the indicating lamp 30. Thus, the tapped portion of the potentiometer 33 and the resistor 22 are connected in series with each other between the terminals 35 and 2 on the series indicator lamp circuit. Therefore, any voltage developed across these two resistors appears across the indicator lamp 30 and the resistor 31 connected in series with it.

The tap 33a is adjusted so that the voltage across the neon lamp 30 is too low to start the lamp but high enough to maintain current in the lamp once it is started. As a consequence, the principal portion of the energy used in illuminating the lamp 30 is supplied by reference voltage source 17.

With the indicating circuit connected as described thus far the indicating lamp 30 will not be ignited until a voltage spike appears between the terminals 1 and 2. However, once the lamp 30 is ignited, it remains ignited regardless of whether the under voltage condition on the monitored cell remains unless some means is provided to extinguish it. In order to avoid this condition a separate circuit is provided to develop a "turn-off" spike to turn off the neon lamp before the occurrence of each voltage spike which appears between the terminals 1 and 2 on the reference circuit due to abnormal or under voltage condition on the monitored cell 9. The circuit which is provided to develop the "turn-off" spike includes a differentiating circuit 36 connected to receive and differentiate the output of the pulse power supply and a blocking rectifier 38 connected in series with the output of the differentiating circuit.

As was previously pointed out, the form of the voltage pulse provided by the pulse power supply 24 is illustrated in Figure 5A. If a conventional differentiating circuit is connected to receive this wave form; for example, the differentiating network illustrated in Figure 18.17 on page 649, volume 19, of the Radiation Laboratory Series entitled "Waveforms," McGraw-Hill, copyrighted 1949. A negative spike is produced by the differentiating circuit upon the occurrence of the leading edge of the rectangular or square wave and a positive spike will occur upon the occurrence of the trailing edge of such a wave. These spikes and their relationship to the wave form of Figure 5A may be seen in Figure 5E. An inspection of this voltage wave output on the differentiating circuit 36 will show that the first spike encountered; i. e., the spike which occurs upon the occurrence of the leading edge of the square wave, occurs at the proper time to turn off the neon light in order that a spike appearing between the terminals 1 and 2, such as illustrated in Figure 5D, may turn the lamp on again if such a spike should occur. However, the positive spike put out by the differentiating circuit at the trailing edge of the differentiated voltage wave (of Figure 5A) would then be of a polarity to trigger the indicating lamp 30. If this should happen, then the lamp would be turned on regardless of whether or not a voltage spike appears between the terminals 1 and 2. Therefore, the blocking rectifier 38 is provided in the series circuit which includes terminal 2 and indicating lamp 30 and which is connected to receive the output of the differentiating circuit 36. This blocking rectifier 38 is poled in such a manner that it will not pass the positive voltage spike (illustrated in Figure 5E). The output of the differentiating circuit which is applied across lamp 30 then contains only the negative voltage spikes as illustrated in Figure 5F. Each time a negative voltage is applied to the lamp 30, the lamp is effectively shunted since this voltage spike is of a magnitude which renders the terminal 2 at least as positive as the upper terminal 3. Thus, the lamp 30 is extinguished once each cycle just before the voltage spike occurs between terminals 1 and 2 due to an under voltage condition on the monitored cell.

The circuit of Fig. 2 has the advantages of having the principal portion of power for the illumination being supplied from the reference source 17 and high sensitivity. The high sensitivity of the circuit is chiefly due to the fact that the magnetic amplifier 10 only supplies the triggering action for the lamp 30. The triggering action is further amplified by the increase in current produced when the arc is established in the indicating lamp. That is to say, that when the indicator lamp 30 is ignited, the resistance of the reference circuit is lowered due to the fact that an additional low resistance current path is provided from the positive side of the reference cell 17 through a portion of the slide wire potentiometer 33, the tap 33a, resistor 31, glow lamp 30, terminal 2, secondary winding 18 of the transformer 16 and reference winding 12. Thus, there is an increase current flow in reference winding 12, which current flow tends to drive the core member 13 further into positive saturation. The magnitude of this action is controlled by the timing of the turn-off pulse from the differentiating circuit 36 relative to the pulse produced in the reference circuit by the supply transformer 16. That is to say, that the amount of reset of the core 13 is influenced by the amplitude and duration of the net change in ampere turns on the core member 13 produced by both the "error current" and the current through the indicator lamp 30.

The action of the circuit of Figs. 1 and 2 have been described with regard to indicating an under voltage on the monitored cell 9; it is to be particularly understood that the circuits may be used equally well to indicate an over voltage. For instance, to indicate an over voltage across the monitored cell 9, the pulse introduced into the monitoring circuit would normally be in a direction to aid rather than oppose the current in the monitoring winding 11 and the ampere turns $NI_1$ supplied by the monitoring winding 11 would normally be made less, rather than greater, than the ampere turns $NI_2$ supplied by the reference winding 12. Since the above discussion establishes that the circuits may be utilized to indicate either an under or an over voltage condition, it becomes obvious that they may also be made to indicate when two voltages are equal. It is equally obvious that the voltage spike which occurs upon the occurrence of the monitored condition may be utilized for purposes other than operating a glow lamp. For example, it may be utilized to operate an alarm, a relay or control circuit.

Another point which should be borne in mind is the fact that the indicating means described above in connection with the circuits of Figs. 1 and 2 may be used equally well in conjunction with either the monitored circuit or the reference circuit. This is so for the reason that the operating parameter for the indicating circuits is a voltage spike caused by the occurrence of the condition being monitored. As described above, the voltage spike which occurs in the reference circuit across the series combination of the voltage pulse supplying transformer secondary winding 18 and the reference winding 12 of the magnetic amplifier 10 is utilized to operate the indicators of Figs. 1 and 2. However, the description of operation above points out that a corresponding voltage spike occurs across the series combination of the pulse supplying transformer secondary winding 15 and the monitoring winding 11 in the monitoring circuit. This voltage spike may also be used to operate indicators, relays or other control devices.

While particular embodiments of this invention have been shown it will, of course, be understood that the invention is not limited thereto since many modifications both in the circuit arrangement and in the instrumentalities employed may be made. It is contemplated that the appended claims will cover any such modifications as fall within the true spirit and scope of this invention.

What I claim as new and desire to secure by Letters Patent of the United States is:

1. In a voltage monitoring apparatus for determining a condition of a monitored voltage source relative to a reference voltage source, a saturable core impedance device having a saturable magnetic core member, a reference winding, and a monitoring winding, said reference and monitoring windings being connected to be energized by the reference and monitored voltage sources respectively whereby said core member receives the differential of the magnetizing forces produced by said windings; means to apply a voltage pulse to each of said windings which pulses are of a polarity to cause the application of additive magnetizing forces to said core member by said windings whereby the degree of magnetization of said core member may be determined, and means coupled to the circuit including said reference voltage source to indicate an unbalanced condition in said core during said pulse.

2. Voltage monitoring apparatus for determining a condition of a monitored voltage source relative to a reference voltage source including a saturable core impedance device having a monitoring winding and a reference winding on a saturable magnetic core member, a monitoring circuit including said monitoring winding adapted to be energized by the monitored voltage source whereby said monitoring winding applies a magnetizing force to said core member in one sense, a reference circuit including said reference winding adapted to be energized by the reference voltage source whereby said reference winding applies a magnetizing force to said core member in a sense opposite to that applied by said monitoring winding, means to introduce voltage pulses into each of said circuits simultaneously, which pulses are of a polarity to cause each of said windings to apply magnetizing forces to said core member of the same sense to determine the relative condition of the voltage sources, and sensing means coupled to said reference circuit for indicating an unbalanced condition in said core during said pulse.

3. In a voltage monitoring apparatus for determining a condition of a monitored voltage source relative to a reference voltage source, a saturable core impedance device having a saturable magnetic core member, a reference winding, and a monitoring winding, said reference and monitoring windings being connected to be energized by the reference and monitored voltage sources respectively whereby said core member receives the differential of the magnetizing forces produced by said windings, means to introduce a voltage pulse into each of said windings which pulses are of a polarity to cause the application of additive magnetizing forces to said core member by said windings, and means connected in circuit relationship with at least one of said reference and monitoring windings to determine any differential between the voltage pulse applied to said winding and the voltage across said winding due to said voltage pulse as an indication of said condition.

4. In a voltage monitoring apparatus for determining a condition of a monitored voltage source relative to a reference voltage source, a saturable core impedance device having a saturable magnetic core member, a reference winding, and a monitoring winding, said reference and monitoring windings being connected to be energized by the reference and monitored voltage sources respectively whereby said core member receives the differential of the magnetizing forces produced by said windings, means to introduce a voltage pulse into each of said windings which pulses are of a polarity to cause the application of additive magnetizing forces to said core member by said windings, and means connected in series circuit relationship with at least one of said reference and monitoring windings to develop any differential between the voltage pulse applied to said winding and the voltage across said winding due to said voltage pulse as an indication of said condition.

5. In a voltage monitoring apparatus for determining a condition of a monitored voltage source relative to a reference voltage source, a saturable core impedance device having a saturable magnetic core member, a reference winding, and a monitoring winding, said reference and monitoring windings being connected to be energized by the reference and monitored voltage sources respectively whereby said core member receives the differential of the magnetizing forces produced by said windings, means to introduce a voltage pulse into each of said windings which pulses are of a polarity to cause the application of additive magnetizing forces to said core member by said windings, means connected in series circuit relationship with at least one of said reference and monitoring windings to develop any differential between the voltage pulse applied to said winding and the voltage across said winding due to said voltage pulse, and indicating means connected to receive and indicate such developed voltage as an indication of said condition.

6. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, and means connected in circuit relationship with at least one of said reference and monitoring windings to determine any differential between the voltage pulse supplied and the voltage across said winding due to said voltage pulse as an indication of said condition.

7. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, and means connected in series circuit relationship with at least one of said reference and monitoring windings to develop any differential between the voltage pulse supplied to the circuit of said winding and the voltage across said winding due to said voltage pulse as an indication of said condition.

8. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, and means connected across the series combination of at least one of said reference and monitoring windings and the associated voltage pulse supply means to determine any differential between the voltage pulse supplied and the voltage across said winding due to said voltage pulse as an indication of said condition.

9. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, and means including a glow lamp connected across the series combination of at least one of said reference and monitoring windings and the associated voltage pulse supply means whereby any differential between the voltage pulse supplied and the voltage across said winding due to said voltage pulse ignites said glow lamp as an indication of said condition.

10. In a voltage monitoring apparatus for determining a condition of a monitored voltage source relative to a reference voltage source, a saturable core impedance device having a saturable magnetic core member, a reference winding, and a monitoring winding, a pair of voltage pulse supply means, said reference and monitoring windings each being connected in series with one of said voltage pulse supply means and connected to be energized by the reference and monitored voltage sources respectively whereby said core member receives the differential of magnetizing forces produced by said voltage sources and the sum of the magnetizing forces produced by the voltage pulses, means including a glow lamp connected across the series combination of at least one of said reference and monitoring windings and the associated voltage pulse supply means whereby any differential between the voltage pulse supplied and the voltage across said winding due to said voltage pulse ignites said glow lamp as an indication of said condition, means to supply said glow lamp with a voltage of sufficient magnitude to sustain current therethrough but not fire said lamp, and means to extinguish said lamp upon the occurrence of each voltage pulse introduced by said voltage pulse supply means.

References Cited in the file of this patent
UNITED STATES PATENTS

| | | |
|---|---|---|
| 2,725,520 | Woodworth | Nov. 29, 1955 |
| 2,752,510 | Hall | June 26, 1956 |